United States Patent [19]

Kumpar

[11] 4,358,283

[45] Nov. 9, 1982

[54] UNIVERSAL JOINT

[75] Inventor: Zvonimir Z. Kumpar, Zeist, Netherlands

[73] Assignee: SKF Industrial Trading & Development Co. B.V., Nieuwegein, Netherlands

[21] Appl. No.: 127,809

[22] Filed: Mar. 6, 1980

[30] Foreign Application Priority Data

Mar. 16, 1979 [NL] Netherlands ......................... 7902092

[51] Int. Cl.³ .............................................. F16D 3/33
[52] U.S. Cl. ..................................... 464/143; 464/906
[58] Field of Search ................... 64/21, 7, 8; 308/206; 464/106, 109, 111, 114, 120, 125, 139, 152, 143

[56] References Cited

U.S. PATENT DOCUMENTS

| 1,781,450 | 11/1930 | Eberling | 308/206 |
| 3,362,192 | 1/1968 | Orain | 64/21 |
| 3,919,861 | 11/1975 | Bellomo | 64/21 |

Primary Examiner—Charles J. Myhre
Assistant Examiner—Carl Stuart Miller
Attorney, Agent, or Firm—Daniel M. Rosen; J. David Dainow

[57] ABSTRACT

A universal joint is provided with an outer ring and has a socket, an inner ring accommodated in the socket, and a set of flatted balls accommodated in groove-like ball races. The ball races are formed in the surface of the socket and in the surface of the inner ring, respectively, to transmit rotation from one ring to the other ring, wherein a ball with its flat face can freely cooperate with a curved surface of a race.

12 Claims, 7 Drawing Figures

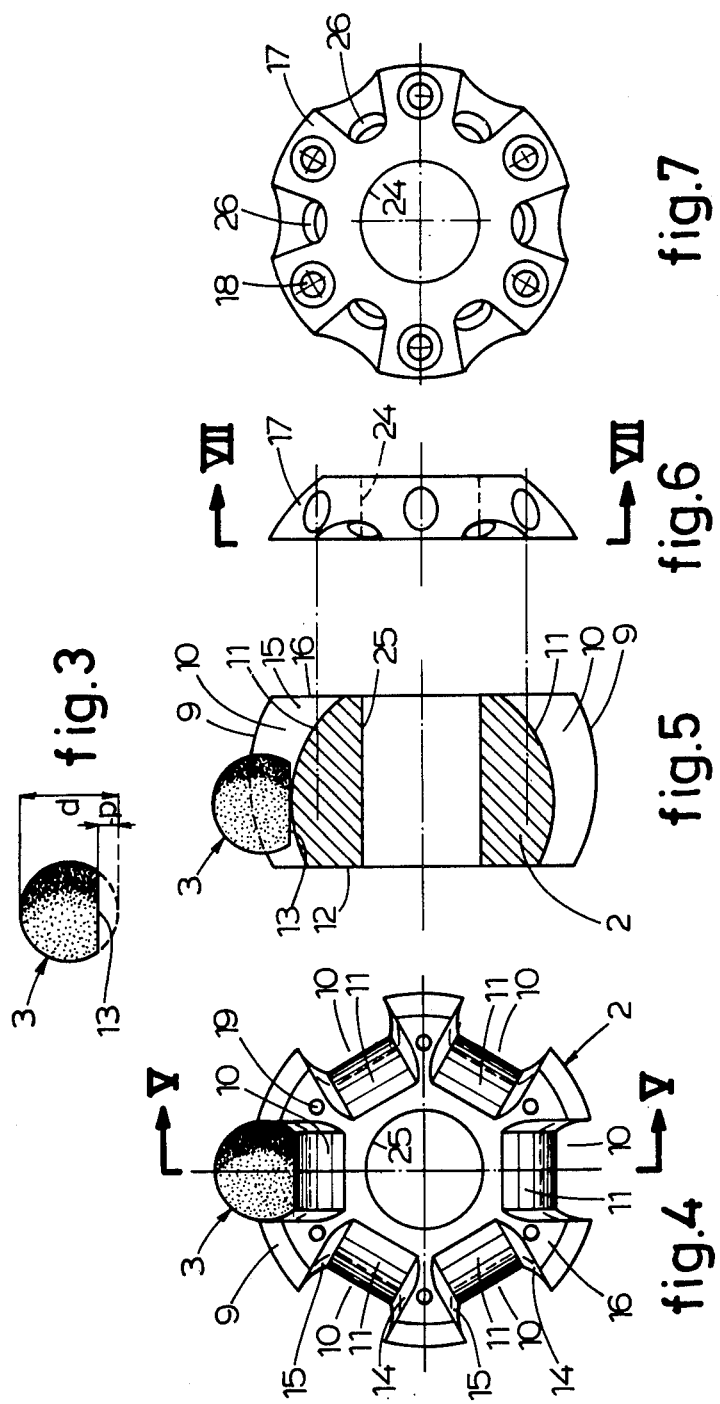

UNIVERSAL JOINT

BACKGROUND OF THE INVENTION

The invention relates to a constant velocity universal joint or coupling provided with an outer ring having a socket, an inner ring accommodated in the socket, and a set of flatted balls accommodated in groove-like ball races formed in the surface of the socket and the surface of the inner ring respectively, to transmit rotation from the one ring to the other ring.

An example of such a universal joint or coupling is disclosed by British patent 1.500.768.

This known coupling is provided further with a cage placed between the outer ring and the inner ring, the case having apertures in which the balls are accommodated. This cage aligns or steers the balls in the bisecting plane. The balls then lie with their faces against flat sides of the apertures and their spherical portions against regular ball race in both the outer ring and the inner ring.

The object of the invention is to provide a universal coupling of simplified construction and assembly. For this purpose, the universal coupling according to the invention is characterized in that a ball with its flat face can freely cooperate with the curved surface of a ball race. "Freely" means that no specific element such as a pin or the like engages the ball with a coupling ring.

As a result, the coupling according to the invention can lack a cage for steering or aligning the balls, and it has been found that by the specific placement of the flat portion of the balls directly on the races, a self-aligning action, as it were, is obtained between the balls and the races during rotation. It has been found that this favorably affects the operation of the coupling, as for example by producing virtually silent rotation under load and flexible compensation of load variations at various angles.

Specifically, the coupling according to the invention may be so constructed that the flat face of the balls is in rotary and/or displaceable cooperation with the curved surface of the ball race of the inner ring. At the same time, the coupling according to the invention may be so constructed that the curved surfaces of the ball races of the inner ring, cooperating with the flat faces of the balls, are turned convex side outward in axial section.

Further, the coupling according to the invention may be so constructed that the curved surface of each ball race of the inner ring, cooperating with the flat face of the balls, are straight lines in planes perpendicular to the axis of rotation of the inner ring, which lines are perpendicular to the central axial plane of the ball race.

Further, the coupling according to the invention may be so constructed that a ball lock ring is mounted on the outer face of the inner ring, with bearing spring members projecting into the ball races of the inner ring. The coupling according to the invention has the additional advantage that assembly, owing to the absence of a cage for the ball, can be carried out in a more convenient manner, namely axially.

Alternatively, the coupling according to the invention may be so constructed that, on the outer end of the outer ring, over the opening of the socket in the outer ring, a yielding sealing ring is arranged, extending to the inner ring or the lock ring.

The invention will now be described with reference to the drawings, showing a preferred embodiment of the universal coupling of the invention by way of example.

DESCRIPTION OF THE DRAWINGS AND THE PREFERRED EMBODIMENT

FIG. 3 is a view of the flatted type ball used in the coupling according to the invention.

FIG. 4 is a front view of the detached inner ring of the coupling, seen in the direction of the arrows IV—IV in FIG. 1.

FIG. 5 is an axial section of the inner ring, viewed along the arrows V—V in FIG. 4.

FIG. 6 is a side view of a detached lock ring to be screwed onto the inner ring to lock in the balls.

FIG. 7 is a back view of the lock ring, seen in the direction of the arrows VII—VII in FIG. 6.

Figure 1:
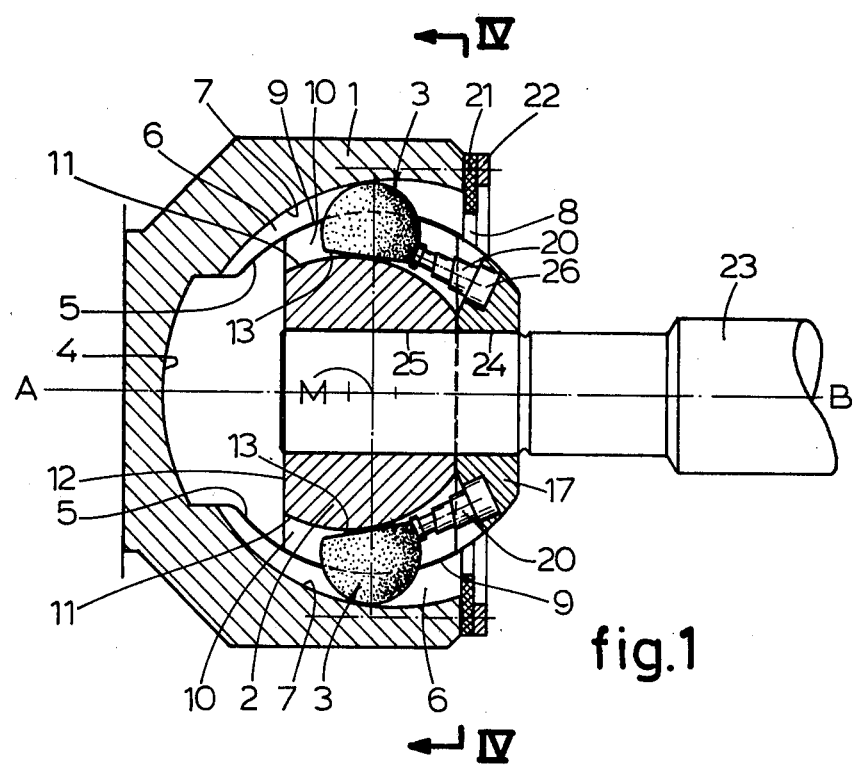
FIG. 1 is an axial section of the universal coupling according to the invention, in the condition where the shafts to be coupling components lie in line with each other.
Figure 2:
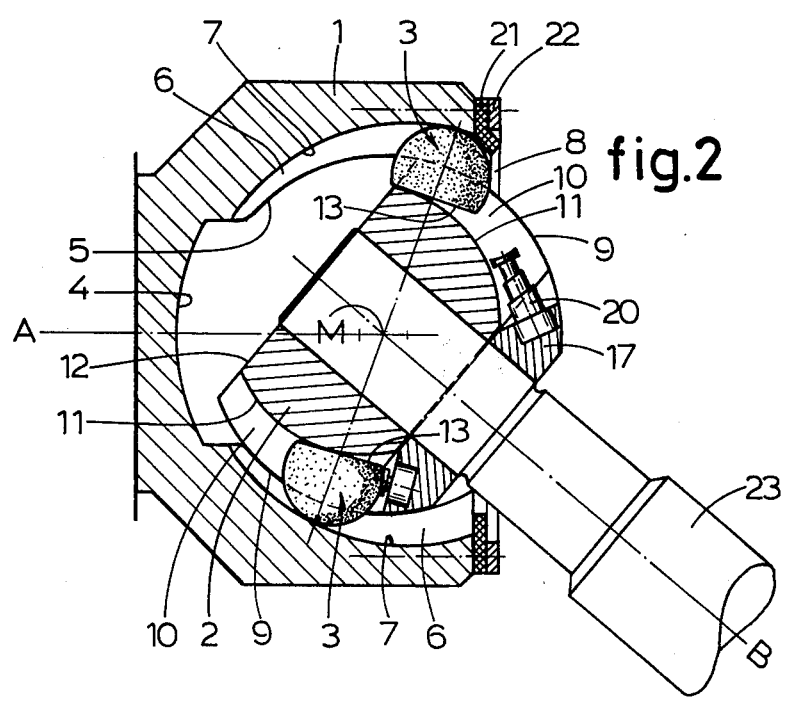
FIG. 2 is an axial section of the coupling of FIG. 1 with maximum deflection of the shafts.

As is shown in FIGS. 1 and 2, the coupling according to the invention consists essentially of a schematically represented outer ring 1, an inner ring 2, and a set of flatted balls 3, usually six, to transmit the rotations from the one ring to the other ring. The cage usually found in such universal couplings to line up the balls, is absent in the coupling according to the present invention. The outer ring 1 is substantially of conventional construction for universal couplings having complete spherical balls and a cage. The axis of rotation of the outer ring is indicated by A-M in FIGS. 1 and 2. The outer ring 1 has a socket 4 of spherical surface 5 with center at M. In this surface 5, evenly spaced around the axis of rotation A-M, groove-like ball races 6 are formed for each of the balls 3. The outer races 6 are generally oriented along planes passing through the axis of rotation A-M. In FIGS. 1 and 2, the bottoms of the grooves of ball races 6 are indicated by circular arcs 7, showing that the ball races 6 become deeper towards the opening 8 of socket 4 towards the outer end of the outer ring 1.

The socket 4 of the outer ring 1 accommodates the inner ring 2, whose axis of rotation is indicated in FIGS. 1 and 2 by B-M. In FIG. 1, the axes of rotation A-M and B-M of the outer ring 1 and inner ring 2 respectively lie in each other's extension, and in FIG. 2 they are at their maximum angle of deflection, about 40°. The inner ring 2 has a spherical outer surface 9 with center M, which outer surface 9 rests directly on the spherical surface 5 of the socket 4 of the outer ring 1. In the spherical outer surface 9 of the inner ring 2, evenly spaced around the axis of rotation B-M, there are as many groove-like ball races 10 as there are balls 3. These inner races 10 are generally oriented in planes passing through the axis of rotation B-M of the inner ring 2. In FIGS. 1, 2 and 5, the bottoms of the grooves of the ball races 10 are indicated by circular arcs 11, showing that the ball races 10 become deeper from the inner end 12 of the inner ring 2 outward. Each ball 3 is accommodated partly in an outer race 6 of the outer ring 1 and partly in an inner race 10 of the inner ring 2, each pair of mating outer and inner races defining one full race. The balls 3 used in the coupling according to the invention are of the flatted type pictured in FIG. 3, with a flat face 13. According to the invention, the flatting of the balls 3 is such that the height p of the spherical segment missing from the sphere 3 because of the flatting is at least 1/5 of the spherical diameter d of the ball 3 (see FIG. 3).

According to the invention, the flat faces 13 of the balls 3 cooperate rotatably and/or displaceably with the bottoms 11 of the ball races 10 of the inner ring 2. As shown especially in FIG. 4, the bottoms 11 of the grooves are specially shaped for this purpose, being rectilinear in cross section in planes perpendicular to the axis of rotation B-M of the inner ring 1, so that line contact of the bottom 11 of the groove with the flat face 13 of the ball 3 is always obtained, along a line crossing the axis of rotation B-M of the inner ring 2 perpendicularly. The width of the bottom 11 of the groove is equal to the diameter of the flat face 13 of the ball 3.

In addition, the ball races 10 of the inner ring 2 are bounded by opposed side walls 14, 15 pictured in particular in FIG. 4, showing that the said side walls 14, 15 are adapted in shape to the spherical portion of the balls 3 with which they come into contact, to lock the balls 3 between them in the circumferential direction of the inner ring 2. Thus the erect walls 14, 15 lie symmetrically at equal distances from the central axial plane of a ball race 10, so that the line of contact of the flat face 13 of the ball 3 with the bottom 11 of the groove is perpendicular to the said central axial plane (the plane of the drawing in FIG. 5).

Surprisingly, it has been found that in the coupling according to the invention that the balls 3 will align themselves in the absence of a ball cage. The inner ring 2 has a flat outer face 16, pictured in FIGS. 4 and 5, on which a lock ring 17 is mounted, shown separately in FIGS. 6 and 7. Securing the lock ring onto inner ring 2 may be done for example by means of screws, not shown, inserted through holes 18 in the lock ring and screwed into corresponding threaded holes 19 in the inner ring. In assembled condition, as shown in FIGS. 1 and 2, the lock ring 17 closes off the right-hand ends of the ball races 10 of the inner ring to retain the balls 3.

As shown in particular in FIGS. 1 and 2, the lock ring 17 also carries spring members 20 which project into the ball races 10 of the inner ring 2 and serve to absorb shocks from the balls 3. For this purpose, the spiral leaf springs shown, accommodated in recessed round seats 26 of lock ring 17, are found to suffice. Additionally there is provided at the outer end of the outer ring 1, over the mouth 8 of the socket 4, a rubber sealing ring 21 projecting towards the lock ring 17 or the inner ring 2. The sealing ring 21 is fixed against the outer end of the outer ring 1 by a metal ring 22. This rubber sealing ring 21 projects over the opening 8 beyond the metal ring 22, so that the rubber sealing ring 21 can deflect when struck by a ball 3, as indicated in FIG. 2, at a large deflection of the axes A-M and B-M. The sealing ring 21 then keeps the balls free from dropping out of the coupling.

FIGS. 1 and 2 further show schematically a conventional drive shaft 23, passed through a bore 24 in the lock ring 17 and into a bore 25 of the inner ring 2, where it is secured against rotation by splines not shown.

The assembly of the coupling according to the invention is simplified by the absence of a cage, and is carried out axially, the inner ring 2 being first placed in the socket 4 of the outer ring 1, after which the balls are arranged in the ball races 6, 10, and then the lock ring 17 is assembled with the inner ring 2.

The invention is not limited to the embodiment above described; thus it is possible, within the scope of the invention, for the flat face of a ball to cooperate with a ball race of the outer ring rather than of the inner ring, or for a ball having two flat faces to cooperate with ball races of the inner and the outer ring.

The characteristic feature of the improvement is that the flat face of a ball is freely rotatable and/or displaceable over the curved surface of a race, i.e. the balls are not forced or steered by a cage, pin members or the like elements, but are able to be displaced mainly under influence of the rotational forces between the two constant velocity universal joint coupling rings.

I claim:

1. In a universal coupling having an outer ring defining therein a socket, an inner ring accommodated in the socket, said socket having an inner surface which defines therein groove-like outer races, said inner ring having an outer surface which defines therein groove-like inner races, said inner and outer surfaces being adjacent, with each outer race positioned adjacent one inner race thereby defining one full race, and a set of flatted balls each having one flat face and being movably secured in one of said full races for transmitting rotation from the one of said rings to the other ring, the improvement wherein said inner race has an outer surface which is curved, and the flat face of each of said flatted balls engages and freely cooperates with said curved surface.

2. A coupling according to claim 1, characterized in that the flat face of each of said flatted balls cooperates displaceably with said curved surface of the inner race.

3. A coupling according to claims 1 or 2 wherein each of said flatted balls is the result of a spherical ball of diameter d having a spherical segment removed leaving a flat face, said segment defining a height p coaxial with a diameter d which extends normal to and through the center of said flat face, the magnitude of p being at least 1/5 d.

4. A coupling according to claim 2, characterized in that the curved surfaces of the inner races cooperating with the flat faces of the balls are convex in an axial section taken through said coupling.

5. A coupling according to claim 4, characterized in that the curved surfaces of the inner races cooperating with the flat faces of the balls are circular in an axial section taken through said coupling.

6. A coupling according to claim 1 wherein said socket has a closed inner end and an open outer end defining a mouth in the axial direction, said inner races of the outer ring are concave in an axial section view, and the radial dimension of the full ball races of the outer and the inner rings becomes greater in the axial direction toward the outer end of the socket.

7. A coupling according to claim 2 characterized in that the curved surface of each outer race in sections along planes perpendicular to the axis of rotation of the inner ring are straight lines perpendicular to the central axis plane of said race.

8. In a universal coupling having an outer ring defining therein a socket, an inner ring accommodated in the socket, said socket having an inner surface which defines therein groove-like outer races, said inner ring having an outer surface which defines therein groove-like inner races, said inner and outer surfaces being adjacent, with each outer race positioned adjacent one inner race thereby defining one full race, and a set of flatted balls each having one flat face and being movably secured in one of said full races for transmitting rotation from the one of said rings to the other ring the, improvement wherein said inner race has an outer surface which is curved, and the flat face of each of said flatted balls engages and freely cooperates with said curved surface, and wherein said inner ring has an outer face corresponding to said outer end of said socket, said coupling further comprises a ball lock ring secured to said outer face and bearing spring elements projecting from said lock ring into the inner races of the inner ring for releasably engaging said balls when said inner ring fully deflects in said socket.

9. A coupling according to claim 8, characterized in that said lock ring defines recessed seats, and each of said spring elements comprises a spiral leaf spring accommodated in one of said recessed seats.

10. A coupling according to claim 6 further comprising a yieldable sealing ring secured in said outer end of the outer ring over the mouth of the socket of the outer ring, said sealing ring projecting radially inward.

11. A coupling according to claim 1 wherein said outer surface of the inner ring and said inner surface of said outer ring are spherical and are in direct engagement.

12. A universal coupling comprising:
(a) an outer ring defining therein a socket with a first central longitudinal axis therethrough,
(b) an inner ring movably secured in said socket with a second central axis therethrough, whereby said axes are movable between co-axial and askew orientation, said outer and inner rings respectively having corresponding inner and outer spherical end surfaces situated adjacently, said inner and outer surfaces each defining therein outer and inner ball races respectively extending axially and radially, each of said inner races being adjacent a mating outer race and thereby forming one full race, and
(c) a set of balls each having a flatted face and movably secured in one of said full races for transmitting rotation from one of said inner and outer rings to the other, said inner races each having a convex curved surface, said flatted face of each of said balls being engaged to and freely cooperating with said convex curved surface of an inner race.

* * * * *

UNITED STATES PATENT AND TRADEMARK OFFICE
CERTIFICATE OF CORRECTION

PATENT NO. : 4,358,283
DATED : November 9, 1982
INVENTOR(S) : Zvonimir Z. Kumpar It is certified that error appears in the above-identified patent and that said Letters Patent are hereby corrected as shown below:

Column 1, line 17, change "case" to --cage--.

Signed and Sealed this

Ninth Day of October 1984

[SEAL]

Attest:

GERALD J. MOSSINGHOFF

Attesting Officer

Commissioner of Patents and Trademarks